W. H. DIXON.
FURNACE STRUCTURE.
APPLICATION FILED MAR. 24, 1920.
1,404,744.
Patented Jan. 31, 1922.
3 SHEETS—SHEET 3.
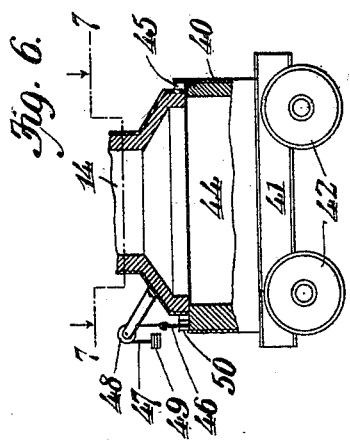
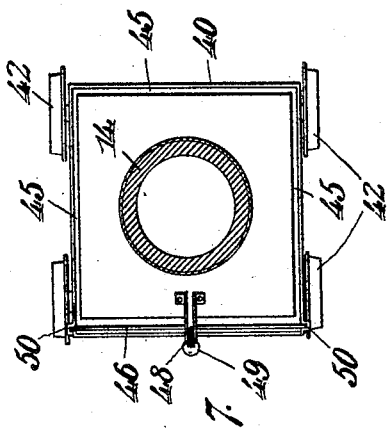
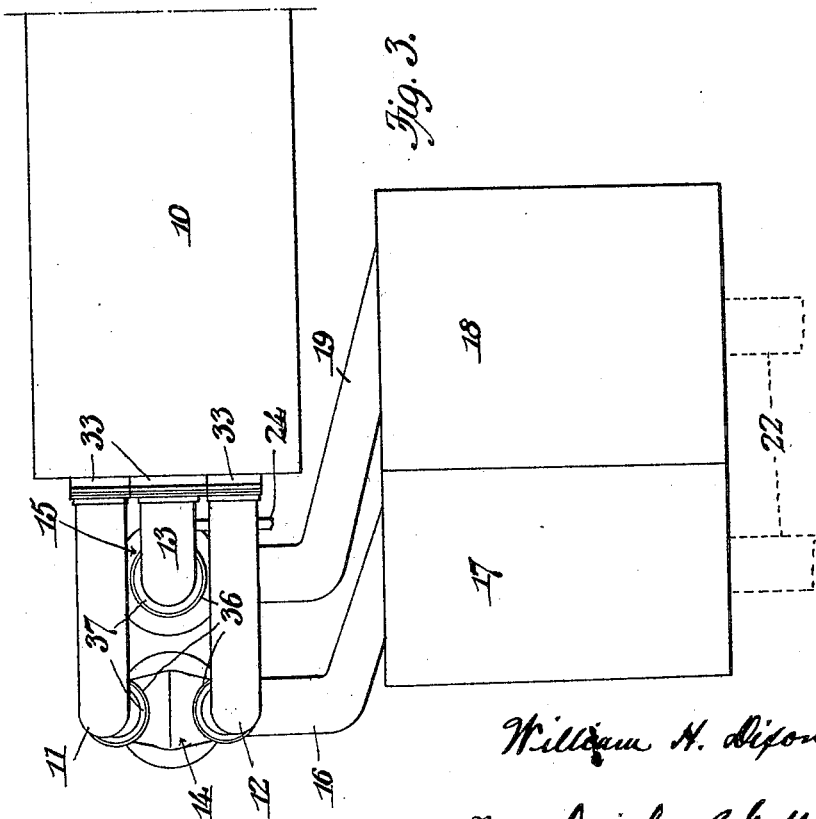
Inventor
William H. Dixon,
By Dwight B. Galt
Attorney

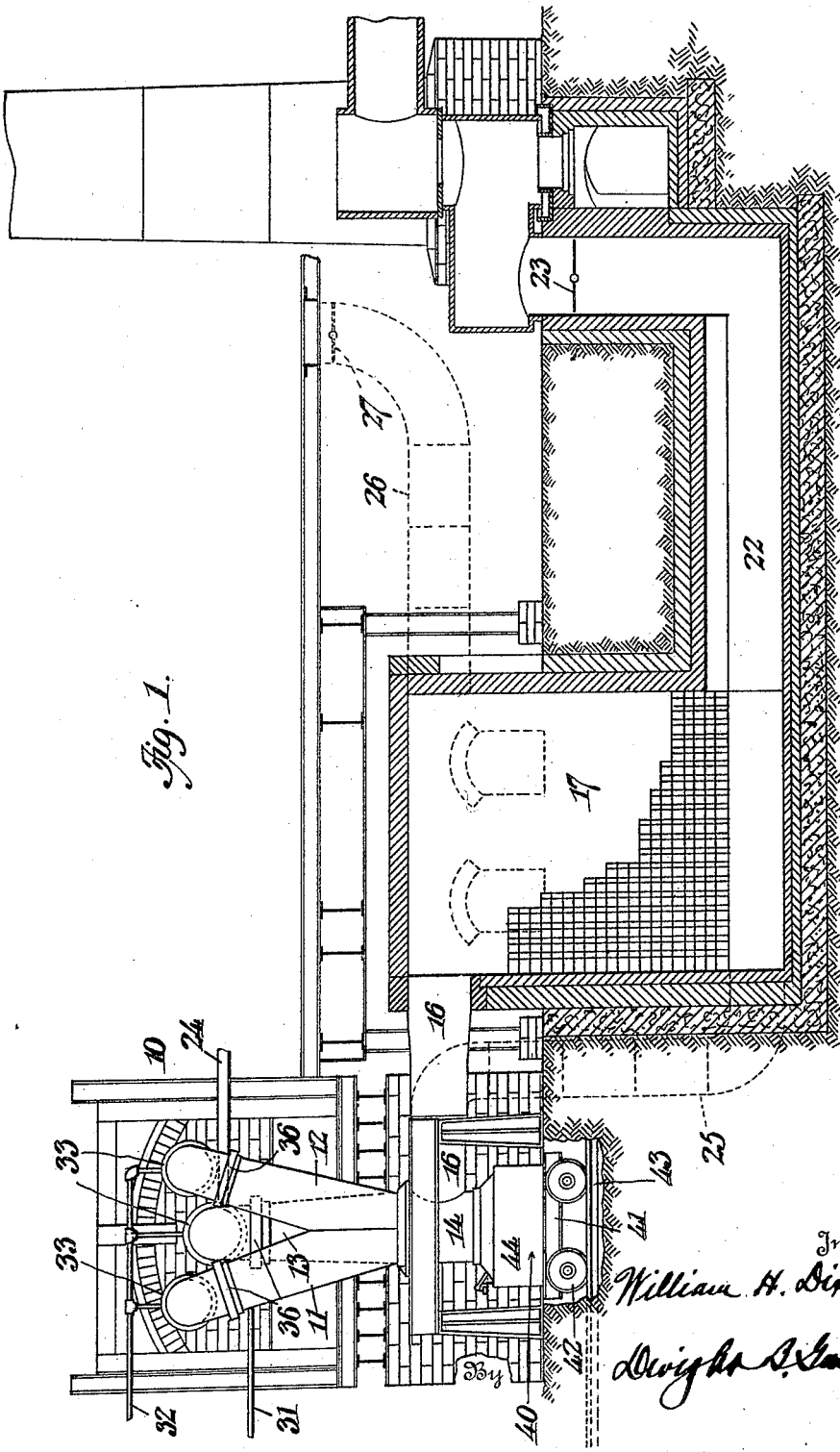

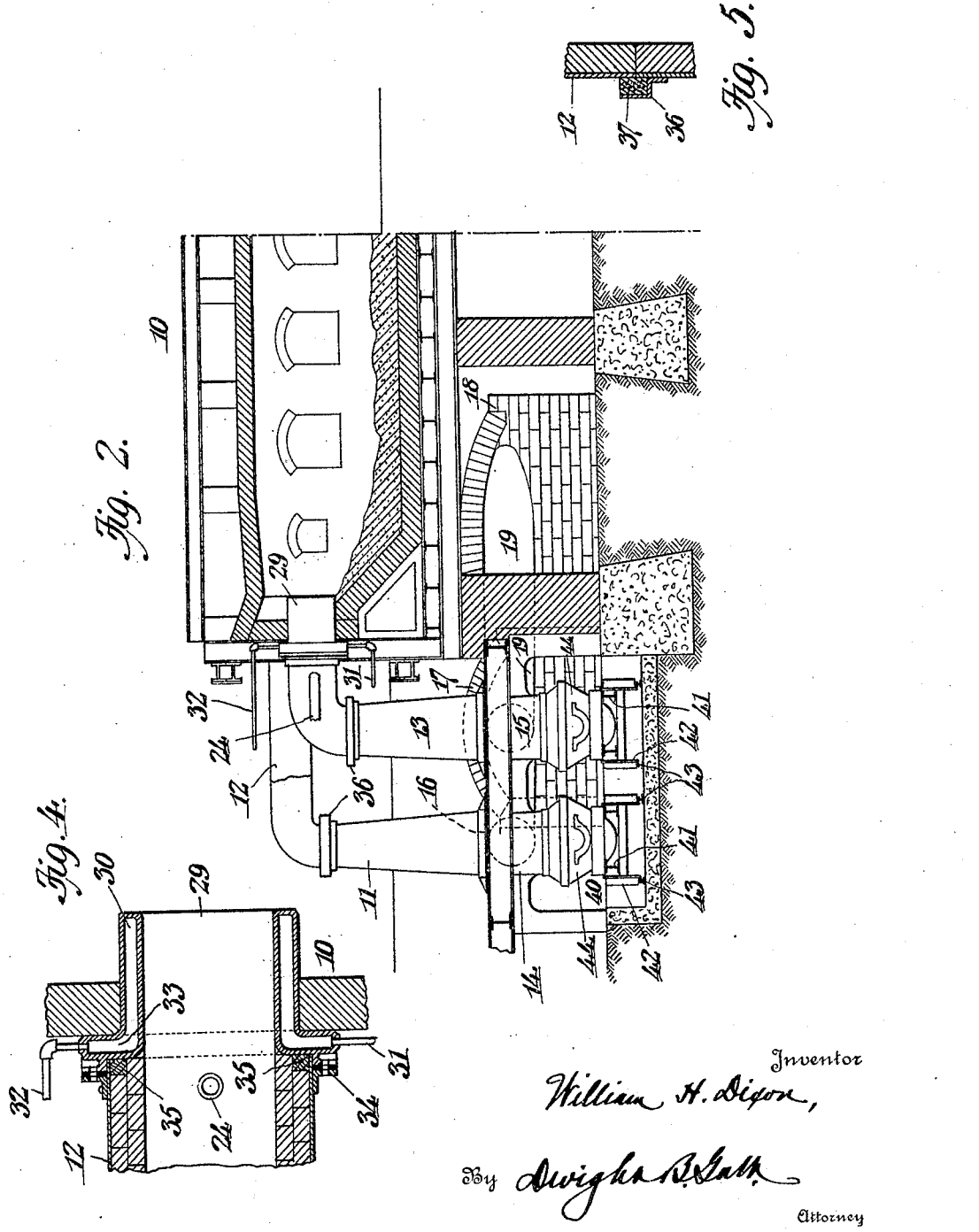

UNITED STATES PATENT OFFICE.

WILLIAM HENRY DIXON, OF TARENTUM, PENNSYLVANIA.

FURNACE STRUCTURE.

1,404,744.   Specification of Letters Patent.   Patented Jan. 31, 1922.

Application filed March 24, 1920. Serial No. 368,382.

*To all whom it may concern:*

Be it known that WILLIAM H. DIXON, a citizen of the United States, residing at Tarentum, in the county of Allegheny and State of Pennsylvania, has invented certain new and useful Improvements in Furnace Structures, of which the following is a specification.

This invention relates to new and useful improvements in furnaces used in the art and manufacture of steel and in which liquid or gaseous fuels are introduced into an open hearth reversing regenerator furnace, or to furnaces other than open hearth melting furnaces, such as heating or reheating furnaces of the reversing type, and in which means of an improved nature are employed for collecting the slag and dust necessarily resulting from the furnace operations, so that such waste matter will not impair the operations of the furnace, and whereby the removal of the waste matters may be facilitated without taking down any of the vital parts of the furnace structure.

A further object of the invention is to provide a furnace of the character stated with improved air and gas tubes to be used for either up or down draft operations, in which the tubes are self-retaining and are provided with means whereby they may be readily disjointed and taken down should occasion demand.

A still further object of the invention is to provide means of an improved nature for connecting the slag buggies with the tubing, whereby an air and gas tight joint between the tubes and buggies is provided, and which joint may be readily broken when it is required to move the buggies.

A still further object of the invention is to provide air and gas tubes for use in connection with furnaces of the character stated, in which the point of injection of the flame will be protected against damage or disintegration due to the necessary high degree of heat, whereby the length of life of such tubing is greatly increased.

With these objects in view, together with others which will appear as the description proceeds, the invention resides in the novel construction, arrangement and combination of parts, all as will be described more fully hereinafter, illustrated in the drawings, and particularly pointed out in the claims.

In the drawings:

Fig. 1 is a sectional view taken through a conventional form of furnace of the character specified, and illustrating the novel arrangement of tubes and slag buggies.

Fig. 2 is a similar view showing the manner in which the tubes project into the furnace hearth, Fig. 3 is a diagrammatic plan view of one end of the furnace and checker chambers, Fig. 4 is an enlarged detail view showing the water jacketed tube section, Fig. 5 is a similar view illustrating the type of mud seal used in connecting the tube sections, Fig. 6 is a side elevation, partly in section, showing the manner in which the slag buggies are detachably connected with the lower end of the vertical tubing, and Fig. 7 is a sectional plan view taken on line 7—7 of Fig. 6.

Referring now to the drawings, 10 represents a conventional form of furnace of the open hearth type, and which is represented as a reversing melting furnace.

As the apparatus at both ends of the furnace is identical in construction, for the sake of brevity, both in description and drawing, only one end of the furnace is illustrated and described.

The end wall of the furnace in the preferred embodiment of the invention has extending thereinto at spaced intervals three pipes or tubes indicated at 11, 12 and 13 respectively. The tubes 11 and 12 extend downwardly in converging relation and open into communication with each other in a larger tube or passage 14, while the tube 13 passes downwardly in spaced relation to its companion tubes and joins with the tubing 15.

The tube section 14 is in communication with an angularly disposed tube 16 which establishes communication with the tubes 11—12 and the air checker chamber 17, while tube section 15 establishes communication between tube 13 and gas chamber 18 by means of the angular tubing 19.

In the present instance, the device is shown in connection with a furnace of the "down-draft" type, and in such case the tubes 16—19 communicate with the upper portions of the checker chambers, so that fumes leaving the furnace through the tubes 11—12—13 will enter the upper portions of the checker chambers, pass downwardly through the checker work, and to the stack through the passages 22. Suitable valves, such as at 23, may be arranged in these passages to control the draft.

In instances where producer gas is used as the heating agency; and when the end of the furnace shown in the drawings is the charging or intake end, the fuel is let into the checker chamber 18, passes through the checker work and is heated, and into the furnace through the tube 13. The fumes pass through the furnace and out through the tubes 11—12—13 at the opposite end of the furnace. The chamber 17 is an air chamber to supply heated air to the furnace to aid combustion. When fuel other than producer gas is used, and admitted through pipe 24, both checker chambers 17 and 18 are air chambers. When gas is used as fuel, the tubing 11—12 carries preheated air to the furnace, while the tubing 13 admits gas to the hearth.

Where the structure of the furnace is of the "up-draft" type, the tubes 16—19 are connected with downwardly inclined tubes 25, shown in dotted lines in Fig. 1 of the drawings. These tubes 25 communicate with the lower ends of the checker chambers 17—18, and fumes passing into the chambers escape therefrom in an upward direction through pipe 26, shown in dotted lines in the said figure. This pipe, it will be noted, communicates with the upper end of the checker chamber, and is provided with a valve 27 to regulate the draft or passage of air, gas or fumes through the pipe; the said valve being arranged near the charging floor so as to be readily accessible.

Each of the tubes 11—12—13 is provided at its point of entrance to the furnace with a water jacket, whereby these parts may be kept relatively cool. Each tube connects with a section 29 which comprises an annular member open at both ends, as shown, and of equal diameter with the tube. This section is fixed in the furnace wall and projects into the hearth, being lined throughout its length and circumference and providing a water jacket 30. This jacket is supplied with water by means of pipes 31, while heated water passes from the section through the pipes 32; the pipes 31—32 connecting with the head portion 33 of the said section. The section 29 is secured to the tubing by means of the flanged ring 34, and a mud seal 35 is provided at the juncture of the tubing with the jacket section. It will be understood that each of the tubes 11—12—13 is similarly provided with a water jacket section 29.

To permit the upright tubes 11—12—13 being disjointed and taken down when required without disturbing the lower portions, these tubes are made in sections, the sections being joined as at 36 and providing a mud seal 37, rendering the joint gas and air tight.

The large tubes 14 and 15, with which the tubes 11—12—13 connect are flared at their lower ends to provide hoods of rectangular shape as shown, and these hoods communicate with the slag buggies 40. The slag buggies comprise trucks 41 having their wheels 42 bearing upon the tracks 43, and each has a hopper 44 to receive slag and waste material passing into the tubes 11—12—13. It is my purpose to construct the device so that the slag buggies may be applied to or removed from the structure without in any way disturbing the tubing or affecting the operation of the furnace. To this end, a breakable joint is established at the juncture of the buggy hoppers with the hoods.

The buggy hoppers are rectangular in plan and of a size slightly larger than the hoods, the upstanding flanges of the hoppers extending above the lower edges of the hoods. The tracks upon which the buggies travel are disposed directly beneath the hoods so that a space 45 will be provided between the side walls of the hoods and the corresponding walls of the buggy hoppers, and between the front wall of the hopper and the front wall of the hood. A vertically movable gate or plate 46 is provided at the rear end of each hood, being of equal width with the hopper, and adapted to close the space between the rear walls of the hopper and hood. A cord or cable 47 connected at one end to the gate and passing over the pulley 48 has weights 49 attached to its opposite end, acting as a counter weight for the gate. The ends of the gate enter guides or grooves 50 at the sides of the buggy hopper.

After the buggies are moved beneath the hoods, the gates 46 are lowered and are engaged at their ends in the guides 50. A continuous upstanding wall is thus provided around the hood, the space between the walls of the hood and buggy hopper being intended to be filled with mud or other plastic material to make an air and gas tight joint between the hopper and buggy. Slag and waste entering the tubes 11—12—13 will drop down into the buggies but no gas or air can escape through the buggies; neither will the draft through the tubes be affected. When it is desired to empty the buggies, the gates will be raised and the mud at the rear ends of the buggies will be broken away, whereupon the buggies may be rolled upon their tracks and emptied of their contents.

It will be understood that various changes in the details of construction may be resorted to without departing from the invention as defined by the claims.

I claim:

1. In a device of the class described, a furnace, tubes communicating with said furnace and extending downwardly therefrom, a passage with which said tubes communicate at their lower ends, the lower end of said passage being open, a branch tube communicating with said passage, and slag buggies to close the lower open end of said passage.

2. In combination; a furnace and checker chambers, tubes establishing communication between said furnace and checker chambers, said tubes being made in sections, an annular member carried by one of the said sections and overlying the juncture of the said sections and spaced from the adjoining section, and plastic material held by the said annular member to seal the joint.

3. In a device of the class described, a tube, a buggy movable beneath said tube and having walls spaced laterally from the walls of the tube, the space between the tube and buggy walls adapted to be filled with a plastic substance whereby an air and gas tight seal is formed.

4. In a device of the class described, a tube, a buggy beneath said tube, the walls of the tube and buggy being spaced apart and in overlapping relation, and the space between the tube and buggy walls adapted to be filled with plastic material whereby a gas and air tight seal is formed.

5. In a device of the class described, a tube, a buggy movable beneath said tube, a hopper on said buggy and having walls spaced from the tube walls and extending above the latter, a gate forming a space between the rear end of the hopper and the corresponding end of the tube, the space between said tube and hopper walls and the tube and gate adapted to be filled with plastic material.

6. In a device of the class described, a tube, a rectangular hood at the lower end of said tube, a buggy movable beneath said hood, a rectangular hopper on said buggy, open at its upper end and being of greater length and breadth than said hood, the walls of said hopper extending above the lower end of said hood, one end of said hopper having its upstanding wall removed, a vertically movable gate carried by the hood and adapted to rest upon the hopper at the open wall thereof, guides on said hopper to receive the ends of said gate, a pulley on said hood, a cable passing over said pulley and connected at one end with said gate, and a weight on the other end of said cable.

7. In a device of the class described, a plurality of tubes connected with a furnace and arranged exteriorly thereof, the said tubes being open at their lower ends, branch tubes connected with the first mentioned tubes above the lower ends of the latter, buggies movable beneath the said lower ends of the said tubes, hoppers on said buggies to move in close contact beneath said tubes, and means for making a gas and air tight seal between said hoppers and said tubes.

8. In a device of the class described, a furnace, tubes communicating with said furnace and extending downwardly therefrom, said tubes communicating with each other at their lower ends, a branch tube communicating with the first mentioned tubes below the point of connection of the latter, the jointed tubes being open below the point of communication of the branch tube therewith, and a slag collector closing said opening.

9. In a device of the class described, a furnace, tubes communicating with said furnace and projecting outwardly from the same, a tube section open at one end, the said tubes joining each other and communicating with said tube section, a branch tube communicating with said tube section inwardly from the open end thereof, and a slag collector closing the open end of said tube section.

10. In a device of the class described, a furnace, tubes communicating with said furnace and extending downwardly therefrom and communicating with each other at their lower ends, a tube section communicating with said tubes below the point of connection of the latter, and a branch tube in communication with the said tube section.

11. In a device of the class described, a furnace, tubes communicating with said furnace and extending downwardly therefrom and communicating with each other at their lower ends, a tube section communicating with the said tubes below the point of connection of the latter, the lower end of said tube section being open, and a branch tube communicating with said tube section above the lower end of the latter.

12. In a device of the class described, a furnace, tubes communicating at their upper ends with said furnace and extending downwardly therefrom in coverging relation, the lower ends of said tubes being joined and forming a substantially large chamber below their point of connection, and a branch tube communicating with said chamber.

In testimony whereof I affix my signature.

WILLIAM HENRY DIXON.